(12) United States Patent
Hiramatsu

(10) Patent No.: US 6,512,917 B1
(45) Date of Patent: Jan. 28, 2003

(54) RADIO COMMUNICATION DEVICE AND TRANSMITTING POWER CONTROL METHOD

(75) Inventor: Katsuhiko Hiramatsu, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/486,106

(22) PCT Filed: Jun. 25, 1999

(86) PCT No.: PCT/JP99/03424

§ 371 (c)(1),
(2), (4) Date: Mar. 16, 2000

(87) PCT Pub. No.: WO00/01093

PCT Pub. Date: Jan. 6, 2000

(30) Foreign Application Priority Data

Jun. 29, 1998 (JP) .......................................... 10-182913

(51) Int. Cl.[7] ................................................ H04B 1/00
(52) U.S. Cl. ........................... 455/69; 455/522; 455/562
(58) Field of Search ........................ 455/63, 67.1, 67.3, 455/68, 69, 133, 134, 135, 277.1, 277.2, 422, 522, 562; 342/378, 380–384

(56) References Cited

U.S. PATENT DOCUMENTS

| | | | | |
|---|---|---|---|---|
| 5,929,811 | A | * | 7/1999 | Rilling ........................ 342/380 |
| 5,999,826 | A | * | 12/1999 | Whinnett ..................... 455/562 |
| 6,085,076 | A | * | 7/2000 | Lindsay et al. .......... 455/277.1 |
| 6,377,812 | B1 | * | 4/2002 | Rashid-Farrokhi et al. . 455/522 |
| 6,400,318 | B1 | * | 6/2002 | Kasami et al. ............... 342/383 |

FOREIGN PATENT DOCUMENTS

| | | |
|---|---|---|
| JP | 10107723 | 4/1998 |
| JP | 11289293 | 10/1999 |

OTHER PUBLICATIONS

PCT International Search Report dated Oct. 5, 1999.
T. Ohgane, "Wave Equalizing Technique for Digital Mobile Communications," ISBN4–88657–801–2, pp. 101–116 (1996), w/partial English translation.
N. Kikuma, "An Introduction to Adaptive Signal Processing Technique Using Array Antenna and High Resolution Arrival Wave Estimation," pp. 62–77 (1997), w/partial English translation.
K. Higuchi et al., "Experiments on Adaptive Transmit Power Control using Outer Loop for W–CDMA Mobile Radio," Technical Report of IEICE, SSE98–18, RCS98–18 (1998–04), w/English abstract.

* cited by examiner

*Primary Examiner*—Nay Maung
(74) *Attorney, Agent, or Firm*—Stevens, Davis, Miller & Mosher, LLP

(57) ABSTRACT

An AAA receiving circuit 105 calculates reception weight of signals received by adaptive array antennas 101, and a direction of arrival estimating circuit 106 estimates a direction of arrival of the received signals. A demodulating circuit demodulates the received signals to separate transmission power control information. A radiation pattern calculating circuit 108 calculates directional gains based on the reception weight and the arrival direction of the received signals. A gain controlling circuit 109 calculates a correction value based on the directional gains and transmission power control information, and controls a gain of a transmission power amplifier. A transmission weight calculating circuit calculates transmission weight based on the reception weight and the correction value. This makes it possible to control transmission power such that reception power of each communication counterpart becomes constant, and to improve communication quality and an increase in the number of containable users in a system wherein directivity is sequentially changed in accordance with the positions of the communication counterparts or a propagation environment.

14 Claims, 5 Drawing Sheets

RADIO COMMUNICATION DEVICE AND TRANSMITTING POWER CONTROL METHOD

TECHNICAL FIELD

The present invention relates to a radio communication apparatus, which performs radio communications using a plurality of antennas, and a transmission power controlling method.

BACKGROUND OF ART

A conventional radio communication apparatus will be explained with reference to FIG. 1.

FIG. 1 is a block diagram showing an entire configuration of the conventional radio communication apparatus. In the radio communication apparatus shown in FIG. 1, a reception RF circuit 3 amplifies signals, which are received by an antenna 1 and input through a coupler 2, and frequency-converts the amplified signals to intermediate frequencies or baseband frequencies.

An SINR measurement circuit 4 measures a ratio (Radio) of a sum of interference wave reception power (Interference) and noise power (Noise) to desired wave reception power (Signal). Comparison between this SINR and a target SINR is performed. If this SINR is smaller than the target SINR, the SINR measurement circuit 4 outputs Transmission Power Control information (hereinafter referred to as "TPC") to control a communication counterpart to increase transmission power. While, if this SINR is larger than the target SINR, the SINR measurement circuit 4 outputs TPC to control the communication counterpart to reduce transmission power.

A demodulating circuit 5 demodulates received signals, and separates received data and TPC from each other.

A multiplexing circuit 6 multiplexes a TPC output from the SINR measuring circuit 4 and transmitted signals. As a multiplexing method, for example, there is a method in which TPC and transmitted signals are assigned to slots.

A modulating circuit 7 modulates an output signal of the multiplexing circuit 6. A transmission RF circuit 8 frequency-converts an output signal of the modulating circuit 7 to a radio frequency, and amplifies it based on TPC, and transmits it through the coupler 2 and antenna 1.

As mentioned above, the conventional radio communication apparatus provides instructions to the communication counterpart such that SINR as one index of reception quality becomes constant, thereby maintaining the reception quality constant.

In accordance with a recent sharp increase in subscribers, there has been demanded a radio communication system in which communication quality and an increase in the number of containable users are improved. In response to this demand, there is a system in which directivity is sequentially changed in accordance with the positions of communication counterparts or a propagation environment.

In this system, a directional gain, which means a gain of s radiation pattern respect to a direction of a subscriber, sometimes change from moment to moment. For this reason, if only transmission power is singly controlled, similar to the conventional radio communication apparatus having the constant transmission directivity, an error in reception power between the communication counterpart and the radio communication apparatus increases, and this prevents the attainment of the purpose of improving the increase in the number of containable users.

In other words, if the directional gains are increased, signals can be transmitted to the communication counterpart by use of power more than necessary, and the communication counterpart can receive the signals with sufficient power, but this causes interference with respect to the other communication apparatuses, and results in deterioration of reception quality. While, if the directional gains are decreased, the communication counterpart can not receive the transmitted signals with sufficient power, resulting in deterioration of reception quality.

DISCLOSURE OF INVENTION

An object of the present invention is to provide a radio communication apparatus, which can control transmission power such that reception power of a communication counterpart becomes constant and which can improve communication quality and an increase in the number of containable users in a system wherein directivity is sequentially changed in accordance with the positions of communication counterparts or a propagation environment, and provide a transmission power control method.

The above object can be attained by calculating a correction value of transmission weight based on directional gains, controlling a gain of transmission power amplifier based on the correction value and transmission power control information, and calculating the transmission weight based on reception weight and correction values of the directional gains calculated from the reception weight.

BEST MODE FOR CARRYING OUT THE INVENTION

Embodiments of the present invention will be specifically explained with reference to the drawings accompanying herewith.

Embodiment 1

Figure 1:
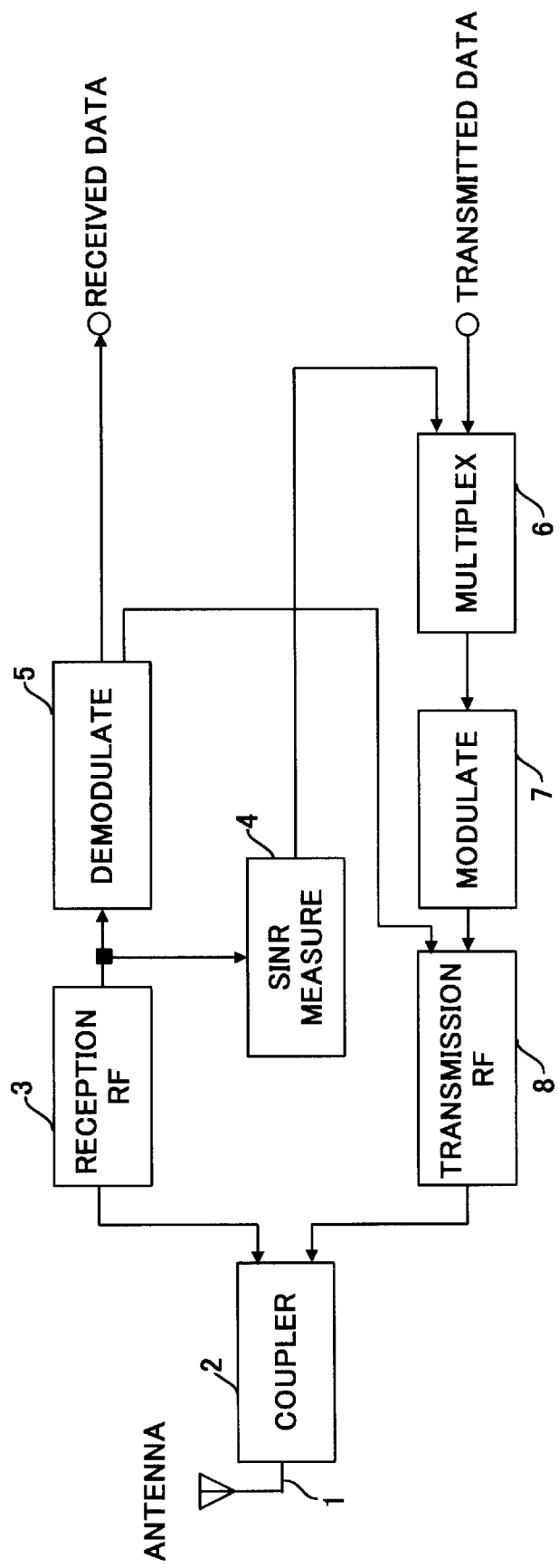
FIG. 1 is a block diagram showing the entire configuration of a conventional radio communication apparatus.
Figure 2:
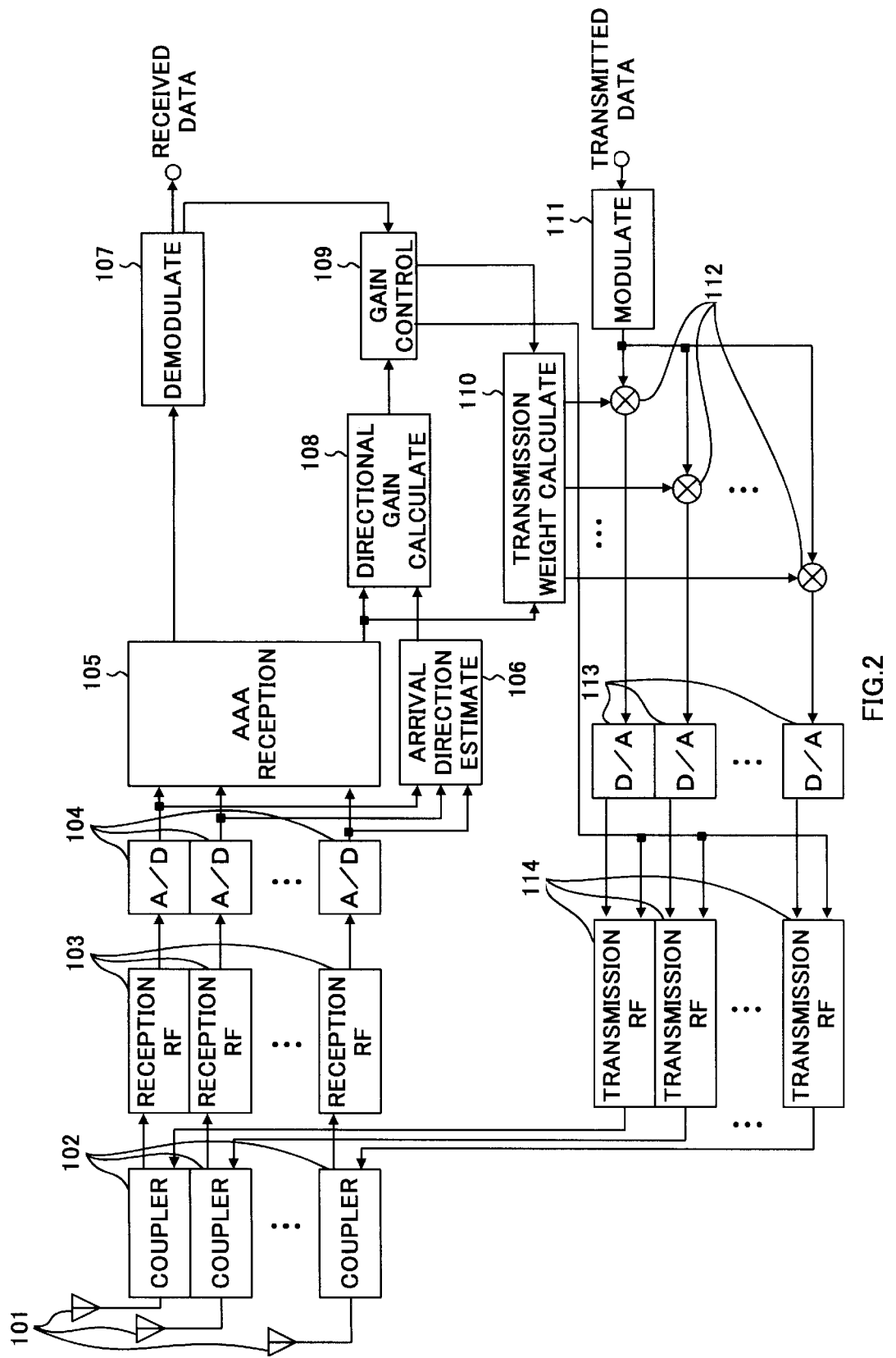
FIG. 2 is a block diagram showing the entire configuration of a radio communication apparatus according to a first embodiment of the present invention.

FIG. 2 is a block diagram showing the entire configuration of a radio communication apparatus according to the first embodiment of the present invention. As shown in FIG. 2, the radio communication apparatus of this embodiment comprises adaptive antennas (hereinafter referred to as "AAA") 101 in which N antenna elements are arranged close to each other (normally, the distance between antenna elements is about a ½ wavelength).

Each of N reception RF circuits 103 amplifies each signal, which has been received by each antenna element 101 and which has been input through each coupler 102, and frequency-converts each amplified signal to an intermediate frequency or a baseband frequency.

Each of N A/D converters 104 converts an output signal of each reception RF circuit 103 to a digital signal.

An AAA receiving circuit 105 calculates reception weight such that SINR of a combined signal of the signals, which have been output from the respective A/D converters 104, reaches a maximum value. The reception weight calculation method is described in the document "Wave Equalizing Technique for Digital Mobile Communications" (Jun. 1, 1996).

If the correlation among signals arriving to the respective antenna elements is large, the AAA receiving circuit 105 can direct directivity toward a direction of arrival by calculating the reception weight appropriately. Therefore, the transmission weight is calculated based on the reception weight and the signals are weighted by the calculated transmission weight so as to be transmitted, with the result that directivity can be directed toward the direction of the communication counterpart.

A direction of arrival estimating circuit 106 estimates a direction of arrival θ of the received signals detected. The arrival direction estimating method is described in the document "An Introduction to Adaptive Signal Processing Technique Using Array Antenna and High Resolution Arrival Wave Estimation" (Oct. 30, 1997).

A demodulating circuit 107 provides demodulation processing to an output signal of the AAA receiving circuit 105, and separates TPC from received data. The separated TPC is output to a gain controlling circuit 109.

A directional gain calculating circuit 108 calculates directional gain g(i) with respect to reception weight W(i) at time i and arrival direction θ at time i based on equation (1) set forth below:

$$g(i)=|W^T(i)s(\theta(i))|^2 \quad (1)$$

Here, W(i) is reception weight at time i, and can be expressed by equation (2) set forth below:

$$W(i)=\{w_0(i),w_1(i),\ldots,w_{N-1}(i)\}^T \quad (2)$$

where $\{\}^T$ denotes an inverted matrix.

Here, s(θ) denotes a transmission array response spectrum (position information of antenna standardized by a transmission carrier frequency), and can be shown by equation (3) using a drawing direction θ of directivity and N antennas:

$$s(\theta)=\{s_0(\theta),s_1(\theta),\ldots,s_{N-1}(\theta)\}^T \quad (3)$$

Figure 3:
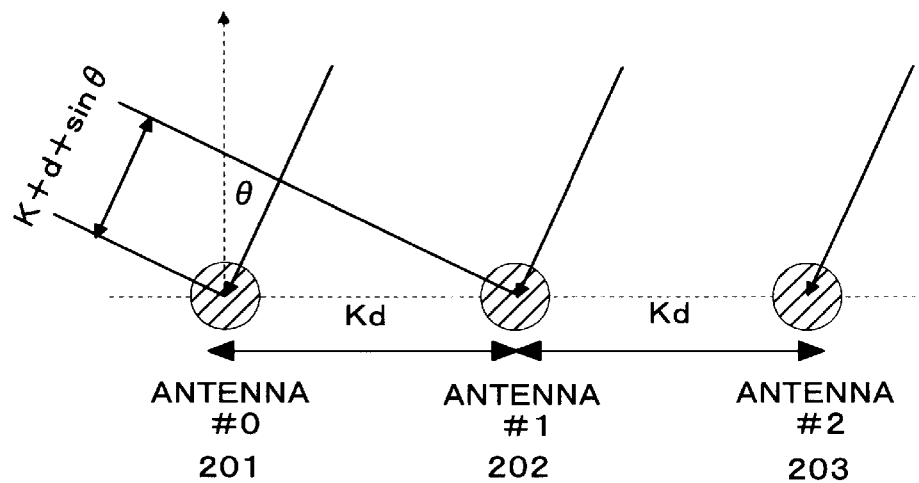
FIG. 3 is a view showing an arrangement state of antennas.

FIG. 3 is a view showing an arrangement state of antennas. It is assumed that the antenna elements 201 to 203 of the array antenna are arranged on a straight line with a distance d as shown in FIG. 3, that a vertical direction is set at an angle of 0°, and that an angle θ is formed clockwise in the alignment of antenna elements 201 to 203. Element $S_n(\theta)$ of an array response vector can be shown by equation (4) set forth below:

$$S_n(\theta)=\exp(j(n-1)kd\sin\theta) \quad (4)$$

where k denotes the number of waves, which is shown by equation (5) set forth below by use of a wavelength λ corresponding to a transmission carrier frequency.

$$k=2\pi/\alpha \quad (5)$$

A gain controlling circuit 109 calculates an amplitude correction value α(i) of transmission weight using equations (6) and (7) described below such that a directional gain $G_D(i)$ at time i becomes a target value $G_{INIT}$. In this case, the target value $G_{INIT}$ is a value, which is equal to a product of directional gain $G_D(i-1)$ at time i-1 and transmission power control $G_T(i)$.

$$G_D(i)=G_{INIT}=\alpha^2(i)g(i) \quad (6)$$

$$a(i)=\sqrt{G_{INIT}/g(i)} \quad (7)$$

Moreover, in consideration of a difference between the directional gain at the time of transmission and the gain due to TPC, the gain controlling circuit 109 calculates a gain control value for controlling the gain of transmission power. For example, if TPC is an instruction of an increase of 1dB and the directional gain is increased by 10dB, the gain controlling circuit 109 outputs a gain control value to effect that the gain of transmission power is reduced by 9dB to a transmission RF circuit 114.

A transmission weight calculating circuit 110 calculates transmission weight V(i) from an amplitude correction coefficient α(i), reception weight W (i) such that the directional gain becomes constant by use of equations (8) and (9). Such control of transmission weight that obtains the constant directional gain eliminates the need for changing the directional gain caused by the change in the reception weight, and this makes it possible to perform transmission power control that reflects TPC included in the received signal accurately.

$$V(i)=\alpha(i)W(i) \quad (8)$$

$$V(i)=\{V_0(i),V_1(i),\ldots,V_{N-1}(i)\}^T \quad (9)$$

A modulating circuit 111 modulates the transmitted signal, a complex multiplying circuit 112 multiplies an output signal of the modulating circuit 111 by the transmission weight, and a D/A converter 113 converts an output signal of the complex multiplying circuit 112 to an analog signal.

A transmission RF circuit 114 frequency-converts an output signal of the D/A converter 113 to a carrier frequency, amplifies the resultant signal based on a gain control value output from the gain controlling circuit 109, and transmits it by the antenna 101 through the coupler 102.

An output signal of the transmission RF circuit 114 is transmitted from the antenna 101 through the coupler 102.

Thus, calculation of the transmission weight to maintain the directional gains due to the directivity transmission constant allows the communication counterpart to receive the transmitted signals with desired power by controlling the gain of transmission power based on TPC and the correction values of directional gains even if the reception weight, which is caused by the change in the positions of the communication counterparts or the propagation environment, is changed.

Here, in a multipath propagation path, the radio communication apparatus with an adaptive array antenna calculates the reception weight of the respective antenna elements in accordance with arrival time of the signal in each path, and combines the received signals, thereby changing the path used in the reception appropriately.

The radio communication apparatus according to Embodiment 1 can maintain the directional gain in each path constant when the transmission directivity is controlled in the multipath propagation path and the path used in the transmission is changed.

Embodiment 2

The radio communication apparatus with an adaptive array antenna has a problem in which the gains are largely changed by a slight shift of directivity when the number of antennas N is large, and a problem in which the accuracy of the estimation of the arrival direction is poor when the number of antennas N is small. Embodiment 2 is one that solves the above-mentioned problems.

The configuration of the radio communication apparatus according to Embodiment 2 is the same as that of Embodiment 1.

Figure 4:
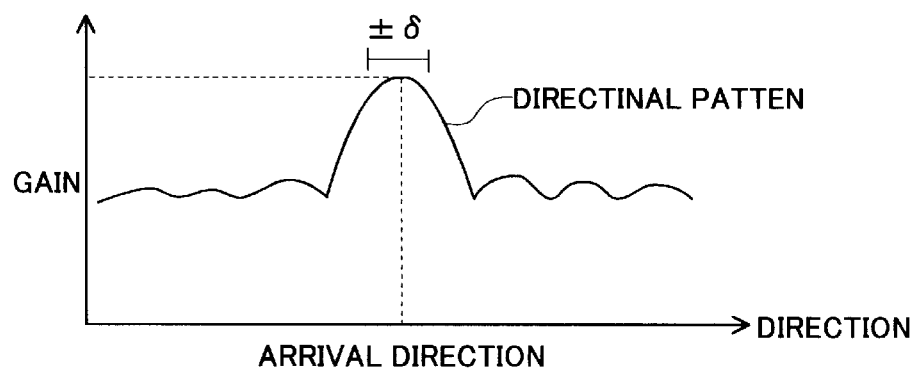
FIG. 4 is a view showing an antenna directional pattern.

FIG. 4 is a view showing an antenna directional pattern. As shown in FIG. 4, the gain controlling circuit 109 obtains an average value of the directional gains in the range of an angle ±δ at the center of an estimated arrival direction.

The average value can be obtained by equation (10) shown in below after a directional measurement area !δ is divided to segments of (2L+1):

$$G_D(i) = \frac{1}{2L+1} \sum_{i=0}^{2L} \left| W^T(i) s\left( \theta(i) + \frac{(l-L)}{L} \delta \right) \right|^2 \quad (10)$$

Thus, the calculation of the directional gains based on the average in the range of an angle ±δ makes it possible to lessen the error of the gains caused by a slight shift of directivity when the number of antennas N is large, and to lessen the error of the gains caused by the poor accuracy of the estimation of the arrival direction when the number of antennas N is small.

Embodiment 3

Embodiments 1 and 2 explained the case in which .transmission power control was performed with respect to the single communication counterpart. Embodiment 3 explains a case in which transmission power control is performed with respect to a plurality of communication counterparts.

Figure 5:
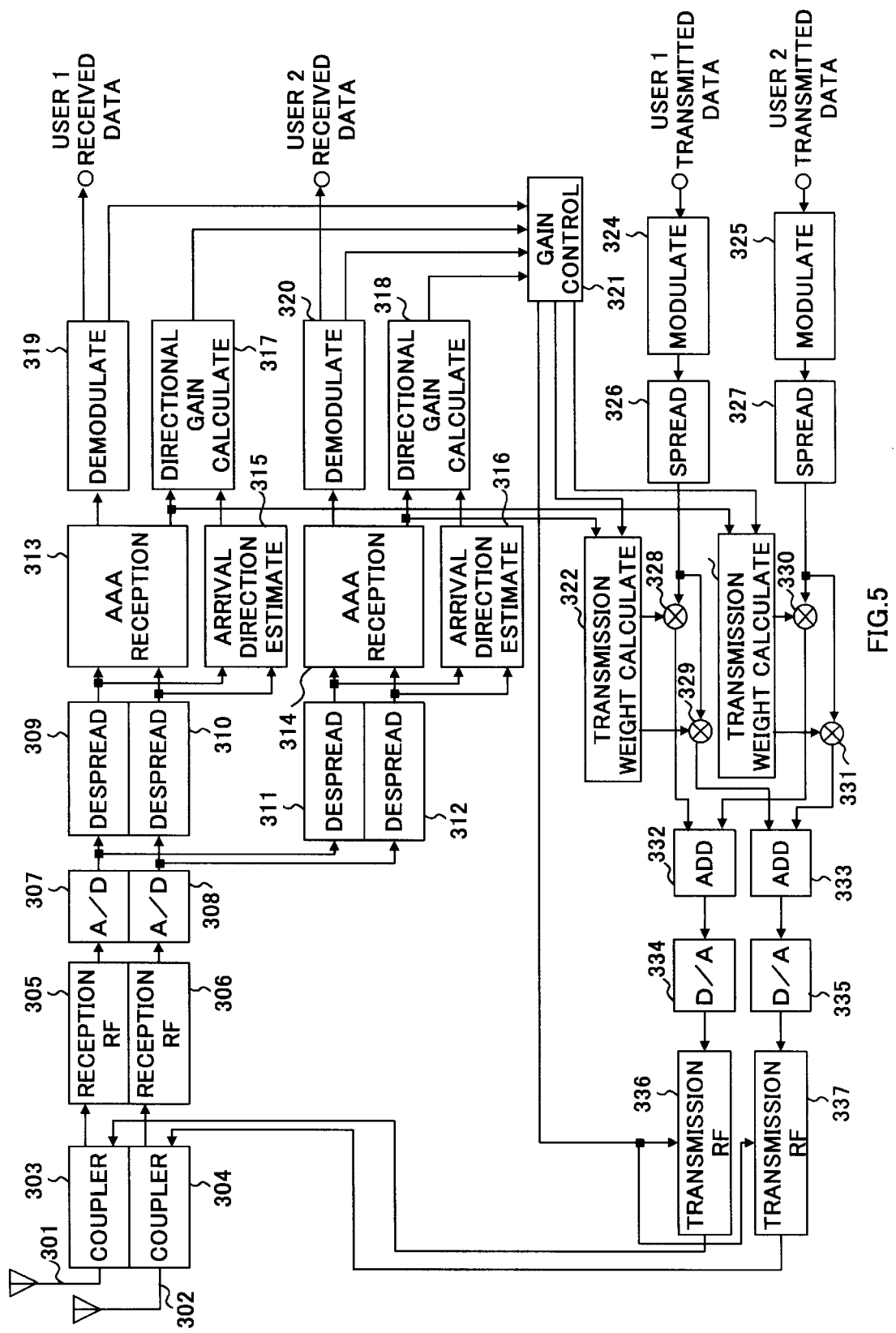
FIG. 5 is a block diagram showing the configuration of a radio communication apparatus according to a third embodiment of the present invention.

FIG. 5 is a block diagram showing the entire configuration of the radio communication apparatus according to Embodiment 3. In Embodiment 3, the explanation is given with the assumption that the number of antenna elements of the adaptive array antenna of the radio communication apparatus is 2 and the number of counterparts for simultaneous communications is 2, that is, user 1 and user 2. Also, the explanation is given of a case of CDMA system in which a plurality of users can communicate at the same frequency and at the same time is used as an example of a communication system. For this reason, Embodiment 3 adopts the configuration in which a spreading circuit and a despreading circuit are added to the configuration of Embodiment 1.

In the radio communication apparatus according to Embodiment 3, signals transmitted from users 1 and 2 are received by antennas 301 and 302.

A reception RF circuit 305 amplifies a signal, which is received by the antenna 301 and input through a coupler 303, and frequency-converts the amplified signal to an intermediate frequency or a baseband frequency. Similarly, a reception RF circuit 306 amplifies a signal, which is received by the antenna 302 and input through a coupler 304, and frequency-converts the amplified signal to an intermediate frequency or a baseband frequency.

An A/D converter 307 converts an output signal of the received RF circuit 305 to a digital signal. Similarly, an A/D converter 308 converts an output signal of the received RF circuit 306 to a digital signal.

A despreading circuit 309 despreads an output signal of the A/D converter 307 using a despread code assigned to user 1. Similarly, a despreading circuit 310 despreads an output signal of the A/D converter 308 using a despread code assigned to user 1.

Also, a despreading circuit 310 despreads the output signal of the A/D converter 307 using a despread code assigned to user 2. Similarly, a despreading circuit 310 despreads the output signal of the A/D converter 308 using a despread code assigned to user 2.

An AAA receiving circuit 313 calculates reception weight such that SINR of a combined signal of the signals, which have been output from the despreading circuits 309 and 310, reaches a maximum value. Similarly, an AAA receiving circuit 314 calculates reception weight such that SINR of a combined signal of the signals, which have been output from the despreading circuits 311 and 312, reaches a maximum value.

A direction of arrival estimating circuit 315 estimates a direction of arrival θ of the signals sent from the user 1 based on the output signals of the despreading circuits 309 and 310. Similarly, a direction of arrival estimating circuit 316 estimates a direction of arrival θ of the signal sent from the user 2 based on the output signals of the despreading circuits 311 and 312.

A demodulating circuit 317 demodulates the output signal of the AAA receiving circuit 313 so as to take out received data of the user 1 and TPC. Similarly, a demodulating circuit 318 demodulates the output signal of the AAA receiving circuit 314 so as to take out received data of the user 2 and TPC.

Directional gain calculating circuits 319 and 320 calculate reception weight Wm(i) of user m at time ii and the directional gains of the arrival direction η m (i) at time I in accordance with equation (11) set forth below. Also, as explained in Embodiment 2, the average value may be calculated by the directional gain calculating circuits 317 and 318.

$$g_m(i) = |W_m^T(i) s(\theta_m(i))|^2 \quad (11)$$

A gain controlling circuit 321 calculates an amplitude correction value $\alpha_m(i)$ of the transmission weight based on directional gain $G_{Dm}(i-1)$ at time (i−1) and transmission power control. Mover specifically, as shown in equations (12) and (13) described below, a correction efficiency $\alpha_m(i)$ is calculated such that the product of directional gain $G_{Dm}(i-1)$ at time (i−1) and transmission power control $G_{Tm}(i)$ is equal to directional gain $G_{Dm}(i)$ at time i.

$$G_{Dm}(i) = G_{Dm}(i-1) \times G_{Tm}(i) = \alpha_m^2(i) g_m(i) \quad (12)$$

$$a_m(i) = \sqrt{\frac{G_{Dm}(i-1) G_{Tm}(i)}{g_m(i)}} \quad (13)$$

Moreover, in consideration of a difference between the directional gain at the time of transmission and the gain due to TPC, the gain controlling circuit 321 calculates a gain control value for controlling the gain of transmission power, and outputs it to transmission RF circuits 336 and 337.

Transmission weight calculating circuits 322 and 323 calculate transmission weight from equation (14) set forth below using the amplitude correction efficiency $\alpha_m(i)$ and the reception weight.

$$V_m(i) = \alpha_m(i) W_m(i) \quad (14)$$

A modulating circuit 324 modulates the transmitted signal of user 1. Similarly, a modulating circuit 325 modulates the transmitted signal of user 2.

A spreading circuit 326 provides spreading processing inherent in user 1 to an output signal of the modulating circuit 324. Similarly, a spreading circuit 327 provides spreading processing inherent in user 2 to an output signal of the modulating circuit 325.

Complex multiplying circuits 328 and 329 multiply an output signal of the spreading circuit 326 by the transmission weight calculated by the transmission weight calculating circuit 322. Similarly, complex multiplying circuits 330 and 331 multiply an output signal of the spreading circuit 327 by the transmission weight calculated by the transmission weight calculating circuit 323.

An adding circuit 332 adds an output signal of the complex multiplying circuit 328, which is a signal sent from the antenna 301, and an output signal of the complex multiplying circuit 330. Similarly, an adding circuit 333 adds an output signal of the complex multiplying circuit 329, which is a signal sent from the antenna 302, and an output signal of the complex multiplying circuit 331.

A D/A converter 334 converts an output signal of the adding circuit 332 to an analog signal. Similarly, a D/A converter 335 converts an output signal of the adding circuit 333 to an analog signal.

A transmission RF circuit 336 frequency-converts an output signal of the D/A converter 334 to a carrier frequency, and amplifies it based on the gain control value output from the gain controlling circuit 321, and transmits it from the antenna 301 through the coupler 303. Similarly, a transmission RF circuit 337 frequency-converts an output signal of the D/A converter 335 to a carrier frequency, and amplifies it based on the gain control value output from the gain controlling circuit 321, and transmits it from the antenna 302 through the coupler 304.

Thus, for communicating with the plurality of communication counterparts at time same time, the transmission weight is calculated for each communication counterpart, and this makes it possible to perform transmission power control for each communication counterpart as using a transmission PA (Power Amplifier) as a common configuration, and makes it possible for each communication counterpart to receive the transmitting signal with desired power.

Embodiment 4

Here, if the dynamic range of the gains is large, there can be considered that the weight becomes substantially zero. Embodiment 4 is one that solves the above problem.

Figure 6:
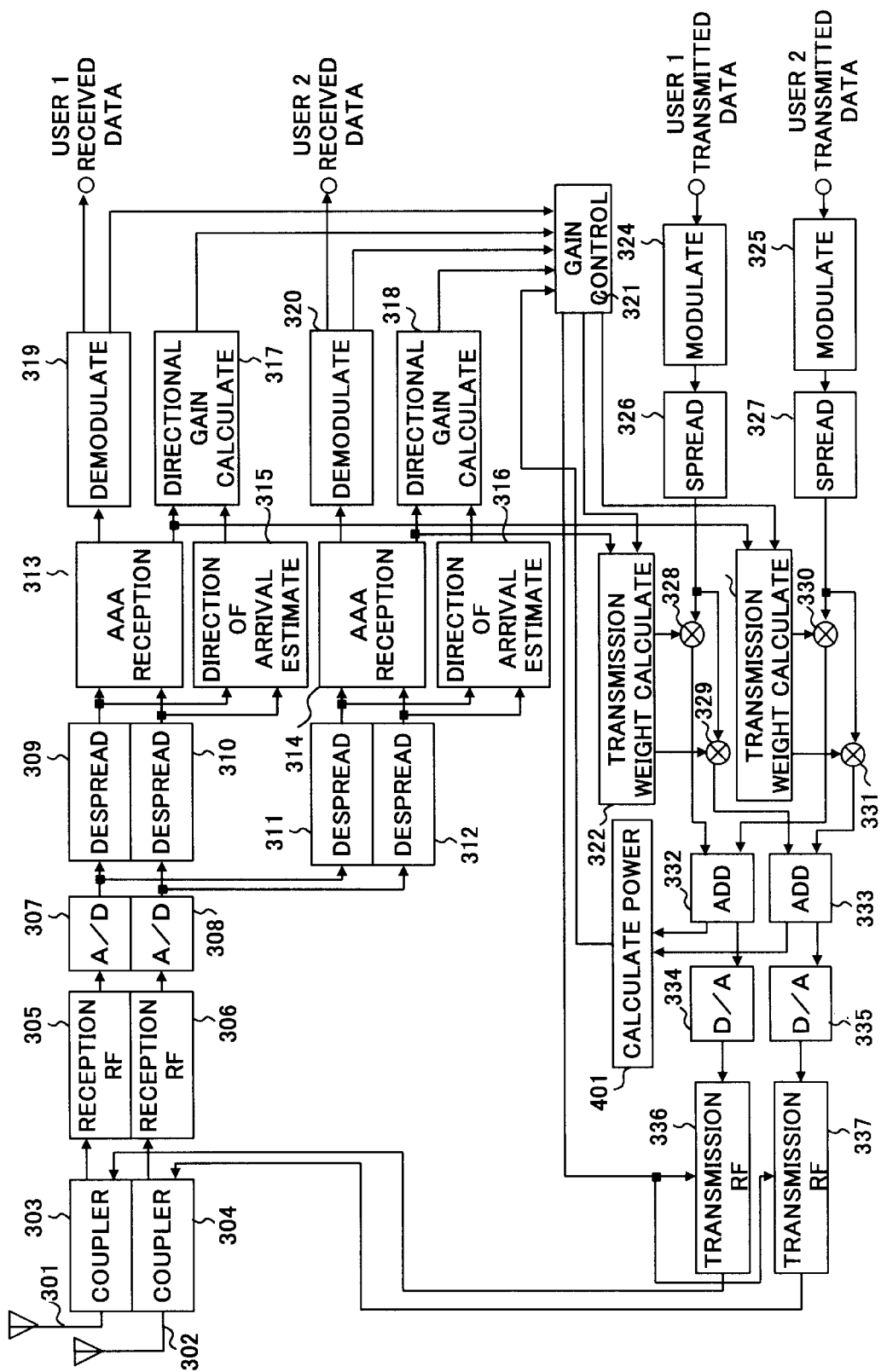
FIG. 6 is a block diagram showing the configuration of a radio communication apparatus according to a fourth embodiment of the present invention.

FIG. 6 is a block diagram showing the entire structure of the radio communication apparatus according to the fourth embodiment of the present invention. As compared with the radio communication apparatus shown in FIG. 5, the radio communication apparatus shown in FIG. 6 adopts the configuration in which a power calculating circuit 401 is added.

It is assumed that a power measurement and a gain update are carried out for each slot in Embodiment 4.

The power calculating circuit 401 calculates power $P_n(i)$ of outputs of adding circuit 332 and 333 by equation (15) set forth below. In equation (15), i is a slot number, j is a symbol number, m is a user number, n is an antenna number, and J is the number of symbols of one slot. Also, $a_m(i, j)$ denotes transmitted signals of user m, slot i, symbol j, and $V_{nm}(i)$ denotes transmitted signals of antenna n, user m, slot i. If the sufficient accuracy can be obtained, there is no need to measure all symbols corresponding to one slot.

$$P_n(i) = \frac{1}{JM} \sum_{j=0}^{J-1} \left( \left| \sum_{m}^{M-1} v_{n,m}(j) a_m(i, j) \right|^2 \right) \quad (15)$$

In the array antenna, if the number of multiple users and that of measurement symbols are large, input power of transmission PA of the transmission RF circuit may be measured with respect to one antenna since the dispersion of power is small between the antennas.

The gain controlling circuit 321 determines whether or not $p_n(i)$ is the range of P±δP. Then, if it is not in this range, a correction coefficient β (i) of weight is calculated by equation (16) set forth below in order to maintain input power to be a constant value P.

$$\beta(i) = \sqrt{\frac{P}{P_n(i)}} \quad (16)$$

The transmission weight with respect to all users is updated. The transmission weight $V_m(i)$ with respect to user m is updated by equation (17) shown below.

$$V_m(i) = \beta(i) V_m(i) \quad (17)$$

In this case, directional gain $G_{DM}(i)$ of user m is updated by equation (18) set forth below.

$$G_{Dm}(i) = \beta^2(i) G_{Dm}(i) \quad (18)$$

In other words, input power of transmission PA is multiplied by a factor of $\beta^2(i)$. This result is corrected by the gain of transmission PA. Gain $G_{PA}(i)$ is updated by equation (19) set forth below.

$$G_{pA}(i) = G_{PA}(i-1)/\beta^2(i) \quad (19)$$

Thus, according to the radio communication apparatus of the fourth embodiment of the present invention, the input power to the transmission PA can be maintained to be the constant value to prevent the weight from reaching in the vicinity of a value of 0, and this makes it possible to perform directional transmission and transmission power control with respect to all users. Industrial Applicability As is obvious from the above explanation, according to the present invention, since both the control of the directional gain and that of transmission power can be performed, the communication counterpart can receive the transmitted signal with desired power, and this makes it possible to improve communication quality and an increase in the number of containable users.

This application is based on the Japanese Patent Application No. HEI10-182913 filed on Jun. 29, 1998, entire content of which is expressly incorporated by reference herein.

I claim:

1. A radio communication apparatus comprising:
an array antenna for forming directivity by a plurality of antenna elements;
directional gain calculating means for calculating directional gains of received signals from said array antenna based on a direction of arrival and reception weight;
transmission gain controlling means for calculating a correction value of transmission weight from said directional gains, and for controlling a gain of a transmission power amplifier based on transmission power control information included in said correction value and said received signals; and transmission weight controlling means for controlling transmission weight based on said reception weight and said correction value.

2. The radio communication apparatus according to claim 1, wherein said transmission gain controlling means calculates the correction value of transmission weight such that the directional gains become constant.

3. The radio communication apparatus according to claim 1, wherein said transmission gain controlling means calculates the correction value of transmission weight such that each directional gain is equal to a product of the previous directional gain and transmission power control information included in the received signals.

4. The radio communication apparatus according to claim 1, wherein the directional gain calculating means calculates each directional gain of each signal transmitted from a plurality of communication counterparts, said transmission gain controlling means calculates the correction value of transmission weight such that each directional gain is equal to a product of the previous directional gain and transmission power control information included in the received signals, said transmission gain controlling means controls the gain of the transmission power amplifier uniformly with respect to all communication counterparts, and said transmission weight controlling means controls the transmission weight for each communication counterpart based on said reception weight and said correction value.

5. The radio communication apparatus according to claim 4, further comprising input power measuring means for combining transmitted signals to the plurality of communication counterparts, and for measuring input power of the transmission power amplifier from the combined transmission signal, wherein said transmission gain controlling means controls the correction value of transmission weight of the transmitted signal to each communication counterpart and the gain of the transmission power amplifier such that the input power falls within a given range.

6. A transmission power controlling method comprising the steps of:

calculating directional gains of received signals from an array antenna, which forms directivity using a plurality of antenna elements based on a direction of arrival and reception weight;

controlling a gain of a transmission power amplifier based on transmission power control information included in the calculated directional gains and said received signals; and controlling transmission weight based on said reception weight and said directional gains.

7. The transmission power controlling method according to claim 6, wherein said transmission weight is controlled such that the directional gains become constant.

8. The transmission power controlling method according to claim 6, wherein said transmission weight is controlled such that each directional gain is equal to a product of the previous directional gain and transmission power control information included in the received signals.

9. The transmission power controlling method according to claim 6, wherein a directional measurement area is divided to predetermined segments in the arrival direction of the received signals, and an average value of the directional gains measured in the divided directional measurement areas is used in gain control of the transmission power amplifier and transmission weight control.

10. A transmission power controlling method comprising the steps of:

calculating a directional gain of each signal, which has been transmitted from a plurality of communication counterparts and which has been received by an array antenna, which forms directivity using a plurality of antenna elements, based on a direction of arrival and a reception weight;

controlling transmission weight such that each directional gain is equal to a product of the previous directional gain and transmission power control information included in the received signals; and controlling a gain of a transmission power amplifier based on said reception weight and said directional gains.

11. The transmission power controlling method according to claim 10, further comprising the steps of:

combining transmitted signals to the plurality of communication counterparts;

measuring input power of the transmission power amplifier from combined transmitted signals; and controlling the transmission weight of the transmitted signals to the respective communication counterparts and the gain of the transmission power amplifier such that the input power falls within a given range.

12. The transmission power controlling method according to claim 10, wherein the received signals are despread by spread codes assigned to the plurality of communication counterparts to be separated for each communication counterpart, and the directional gain of each received signal separated is calculated for each communication counterpart based on the arrival direction and the reception weight.

13. A base station apparatus comprising a radio communication apparatus, said radio communication apparatus comprising:

an array antenna for forming directivity by a plurality of antenna elements;

directional gain calculating means for calculating directional gains of received signals from said array antenna based on a direction of arrival and reception weight;

transmission gain controlling means for calculating a correction value of transmission weight from said directional gains, and for controlling a gain of a transmission power amplifier based on transmission power control information included in said correction value and said received signals; and transmission weight controlling means for controlling transmission weight based on said reception weight and said correction value.

14. A communication terminal apparatus comprising a radio communication apparatus, said radio communication apparatus comprising:

an array antenna for forming directivity by a plurality of antenna elements;

directional gain calculating means for calculating directional gains of received signals from said array antenna based on a direction of arrival and reception weight;

transmission gain controlling means for calculating a correction value of transmission weight from said directional gains, and for controlling a gain of a transmission power amplifier based on transmission power control information included in said correction value and said received signals; and transmission weight controlling means for controlling transmission weight based on said reception weight and said correction value.

* * * * *